(12) United States Patent
Kilroy et al.

(10) Patent No.: US 10,108,995 B2
(45) Date of Patent: Oct. 23, 2018

(54) ONLINE AND OFFLINE COLLABORATION ASSOCIATED WITH SHOPPING AND PURCHASING

(71) Applicant: Yahoo! Inc., Sunnyvale, CA (US)

(72) Inventors: Jonathan Kilroy, Champaign, IL (US); Allie K. Watfa, Urbana, IL (US); Dale Nussel, Mahomet, IL (US); Mangesh Pardeshi, Champaign, IL (US)

(73) Assignee: Excalibur IP, LLC, New York, NY (US)

( * ) Notice: Subject to any disclaimer, the term of this patent is extended or adjusted under 35 U.S.C. 154(b) by 974 days.

(21) Appl. No.: 13/889,032

(22) Filed: May 7, 2013

(65) Prior Publication Data

US 2014/0337169 A1   Nov. 13, 2014

(51) Int. Cl.
*G06Q 30/06* (2012.01)

(52) U.S. Cl.
CPC .................. *G06Q 30/0609* (2013.01)

(58) Field of Classification Search
CPC .................................. G06Q 30/0609
USPC ....................................... 705/26.35
See application file for complete search history.

(56) References Cited

U.S. PATENT DOCUMENTS

| | | | | |
|---|---|---|---|---|
| 6,317,718 B1 * | 11/2001 | Fano | ............... | G06F 17/3087 705/14.39 |
| 7,729,945 B1 * | 6/2010 | Katz | ............... | G06Q 30/02 705/14.58 |
| 8,135,624 B1 * | 3/2012 | Ramalingam | ............... | G06Q 20/10 705/26.1 |
| 8,160,929 B1 * | 4/2012 | Park | ............... | G06Q 30/00 705/26.1 |
| 8,412,626 B2 * | 4/2013 | Hirson | ............... | G06Q 20/32 705/35 |
| 8,571,986 B2 * | 10/2013 | Dooley Maley | ............... | G06Q 20/35785 235/379 |
| 8,666,376 B2 * | 3/2014 | Ramer | ............... | G06Q 30/02 455/414.3 |
| 9,076,175 B2 * | 7/2015 | Ramer | ............... | G06Q 30/02 |
| 2003/0028413 A1 * | 2/2003 | White | ............... | G06Q 10/101 705/300 |
| 2003/0065805 A1 * | 4/2003 | Barnes, Jr. | ............... | G06Q 10/02 709/231 |

(Continued)

OTHER PUBLICATIONS

Kindberg, Tim, et al. "People, Places, Things: Web Presence for the Real World." Mobile Networks and Applications, vol. 7, No. 5, 2002, pp. 365.*

*Primary Examiner* — Alexis M Casey
(74) *Attorney, Agent, or Firm* — Mauriel Kapouytian Woods LLP; Lana Akopyan; James Wood

(57) ABSTRACT

Techniques are provided that include using a collaborative arrangement between a first entity associated with a physical location, such as a physical store or residence that has or sells one or more products of a first product type, and a second entity, such as a Web site offering for purchase products of the first product type. According to some such arrangements, if, for example, a user purchases a product from the Web site after the user evidently made a visit to the physical location, or received a display or demonstration of a product of the first product type at the physical location, then revenue or value resulting from the purchase may be split or shared between entities including the first entity and the second entity.

18 Claims, 6 Drawing Sheets

(56) References Cited

U.S. PATENT DOCUMENTS

| | | | |
|---|---|---|---|
| 2005/0187873 A1* | 8/2005 | Labrou | G06Q 20/02 705/40 |
| 2005/0256802 A1* | 11/2005 | Ammermann | G06Q 20/02 705/44 |
| 2007/0194113 A1* | 8/2007 | Esplin | G06Q 20/10 235/383 |
| 2007/0203836 A1* | 8/2007 | Dodin | G06Q 20/02 705/44 |
| 2009/0157518 A1* | 6/2009 | Bishop | G06Q 20/02 705/19 |
| 2009/0327151 A1* | 12/2009 | Carlson | G06Q 30/02 705/80 |
| 2010/0082485 A1* | 4/2010 | Lin | G06Q 20/12 705/44 |
| 2010/0145861 A1* | 6/2010 | Law | G06Q 20/102 705/76 |
| 2010/0211460 A1* | 8/2010 | Agarwal | G06Q 30/02 705/14.46 |
| 2010/0327054 A1* | 12/2010 | Hammad | G06F 21/34 235/375 |
| 2011/0153495 A1* | 6/2011 | Dixon | G06Q 20/10 705/39 |
| 2011/0258115 A1* | 10/2011 | Mulhim | G06Q 20/108 705/42 |
| 2011/0302022 A1* | 12/2011 | Fordyce, III | G06Q 20/10 705/14.35 |
| 2012/0209672 A1* | 8/2012 | Winner | G06Q 30/02 705/14.13 |

\* cited by examiner

ONLINE AND OFFLINE COLLABORATION ASSOCIATED WITH SHOPPING AND PURCHASING

BACKGROUND

More and more, shoppers prefer to make purchases of products online, as opposed to purchasing from physical "brick and mortar" stores. There can be many reasons for this trend, including the time savings and convenience of shopping from home, possible savings or less taxes, ease of online product research and comparison, etc. In spite of this, however, there remains and will remain value that only physical stores can provide. For certain types of products, a shopper may wish to obtain the physical "look and feel" of the product (such as clothing, for example), see it in person, perhaps ask questions in-person, or obtain a physical showing or demonstration of the product (such as a television or home stereo, for example).

As such, in many instances, shoppers may visit a physical store that carries a product, but then buy the product online. This can have the effect of excluding the physical store from any profit, even though the physical store offered, and incurred the expenses for, the opportunity for the shopper to see the product, for example. As one result, for example, physical stores may be discouraged from carrying such products or allowing displays or demonstrations, or some physical stores may even fail. This, in turn, may result in a suboptimal overall situation, with less purchasing and less revenue, which can burden physical stores, discourage shoppers, reduce sales, etc.

SUMMARY

Some embodiments of the invention provide systems and methods that include using a collaborative arrangement between a first entity associated with a physical location, such as a physical store or residence that has or sells one or more products of a first product type, and a second entity, such as a Web site offering for purchase products of the first product type. According to some such arrangements, if, for example, a user purchases a product from the Web site after the user evidently made a visit to the physical location, or received a display or demonstration of a product of the first product type at the physical location, then revenue or value resulting from the purchase may be split or shared between entities including the first entity and the second entity.

Techniques are provided, for example, in which a physical beaconing technique may be utilized, which may include utilizing wirelessly transmitted, received, and stored information regarding physical location of the user, such as GPS information, in order to obtain evidence of the user having made the visit.

While the invention is described with reference to the above drawings, the drawings are intended to be illustrative, and the invention contemplates other embodiments within the spirit of the invention.

DETAILED DESCRIPTION

Figure 1:
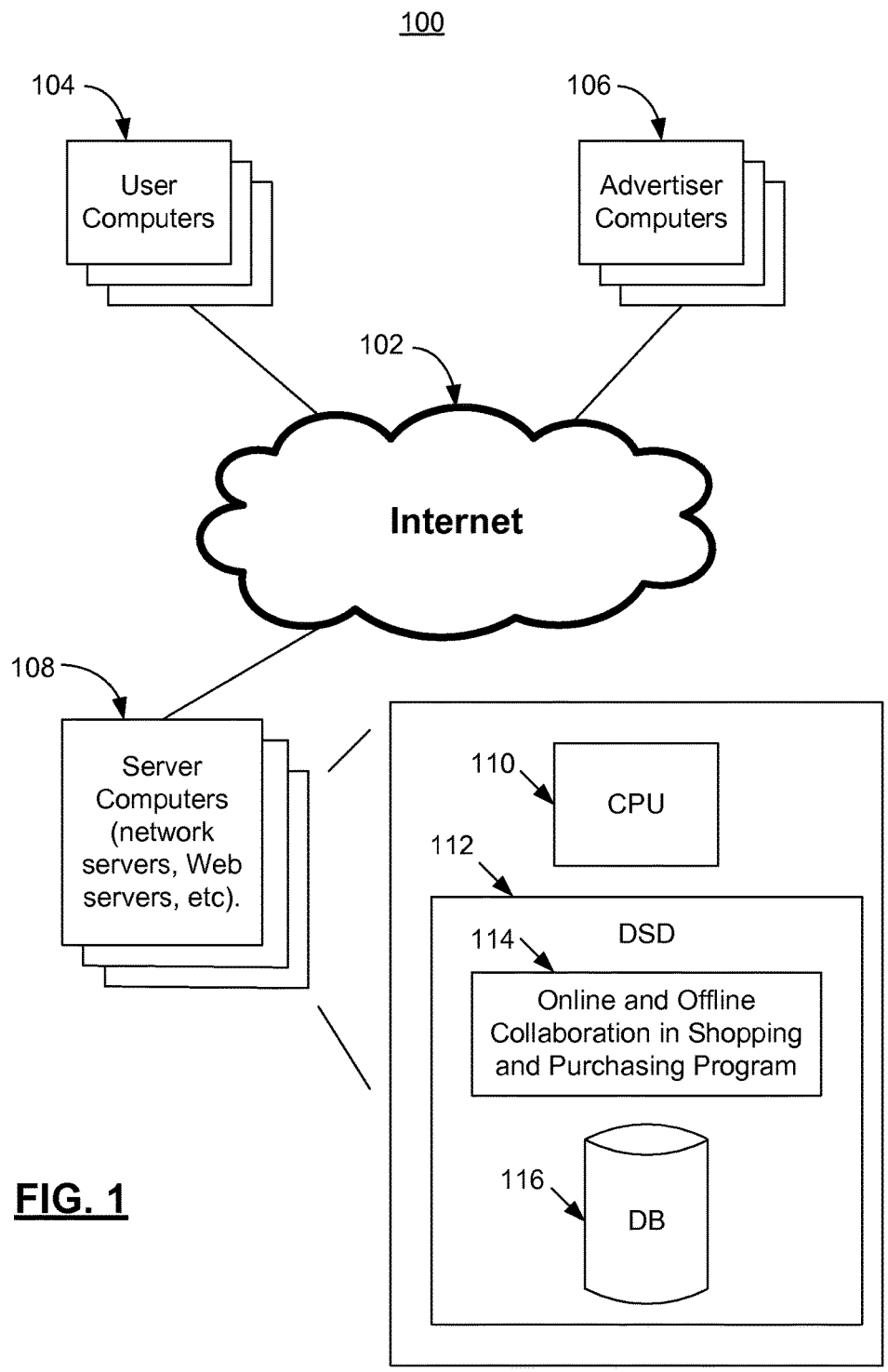
FIG. 1 is a distributed computer system according to one embodiment of the invention.

FIG. 1 is a distributed computer system 100 according to one embodiment of the invention. The system 100 includes user computers 104, advertiser computers 106 and server computers 108, all coupled or able to be coupled to the Internet 102. Although the Internet 102 is depicted, the invention contemplates other embodiments in which the Internet is not included, as well as embodiments in which other networks are included in addition to the Internet, including one more wireless networks, WANs, LANs, telephone, cell phone, or other data networks, etc. The invention further contemplates embodiments in which user computers or other computers may be or include wireless, portable, or handheld devices such as cell phones, smart phone, PDAs, tablets, etc.

Each of the one or more computers 104, 106, 108 may be distributed, and can include various hardware, software, applications, algorithms, programs and tools. Depicted computers may also include a hard drive, monitor, keyboard, pointing or selecting device, etc. The computers may operate using an operating system such as Windows by Microsoft, etc. Each computer may include a central processing unit (CPU), data storage device, and various amounts of memory including RAM and ROM. Depicted computers may also include various programming, applications, algorithms and software to enable searching, search results, and advertising, such as graphical or banner advertising as well as keyword searching and advertising in a sponsored search context. Many types of advertisements are contemplated, including textual advertisements, rich advertisements, video advertisements, coupon-related advertisements, group-related advertisements, social networking-related advertisements, etc.

The server computers 108 can include server computers associated with a network, such as a Web portal, server computers associated with Web sites such as may allow online purchasing by users, and other server computers by other entities.

As depicted, each of the server computers 108 includes one or more CPUs 110 and a data storage device 112. The data storage device 112 includes a database 116 and an Online and Offline Collaboration in Shopping and Purchasing Program 114. In some embodiments, different server computers, or server computers associated with different entities, may include different programs. For example, network server computers may utilize a certain Program, whereas Web site server computers may utilize other programs, etc.

The Program 114 is intended to broadly include all programming, applications, algorithms, software, engines, modules, functions, and other tools necessary to implement or facilitate methods and systems according to embodiments of the invention, and may vary, for example, depending on the server computer or the associated entity (e.g., the network or a Web site). The elements of the Program 114 may exist on a single server computer or be distributed among multiple computers or devices.

Figure 2:
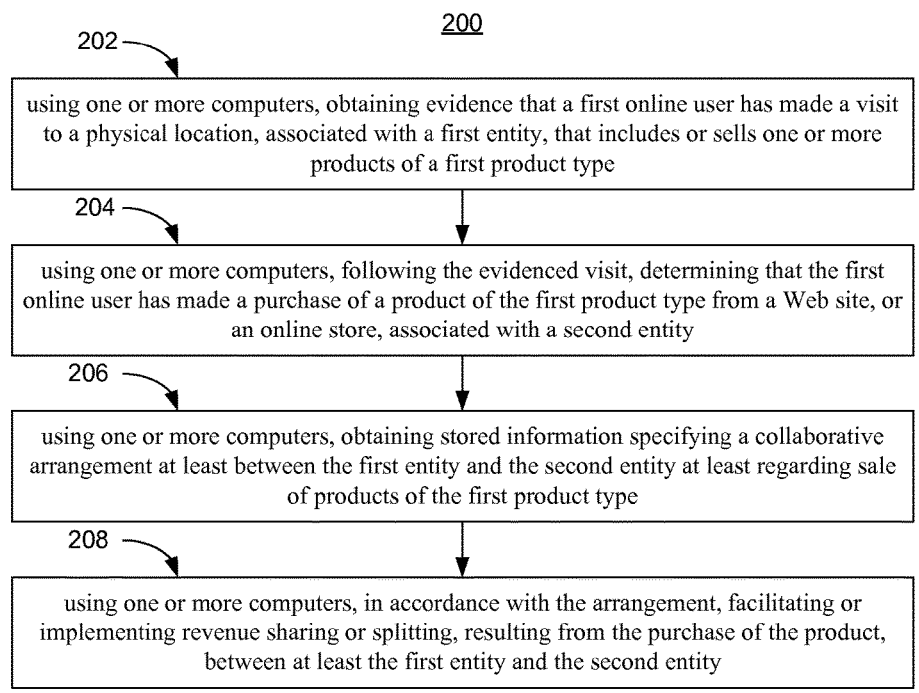
FIG. 2 is a flow diagram illustrating a method according to one embodiment of the invention.

FIG. 2 is a flow diagram illustrating a method 200 according to one embodiment of the invention. Step 202 includes, using one or more computers, obtaining evidence that a first online user has made a visit to a physical location, associated with a first entity, that includes or sells one or more products of a first product type.

Step 204 includes, using one or more computers, following the evidenced visit, determining that the first online user has made a purchase of a product of the first product type from a Web site, or on online store, associated with a second entity.

Step 206 includes, using one or more computers, obtaining stored information specifying a collaborative arrangement at least between the first entity and the second entity at least regarding sale of products of the first product type.

Step 208 includes, using one or more computers, in accordance with the arrangement, facilitating or implementing revenue sharing or splitting, resulting from the purchase of the product, between at least the first entity and the second entity.

Figure 3:
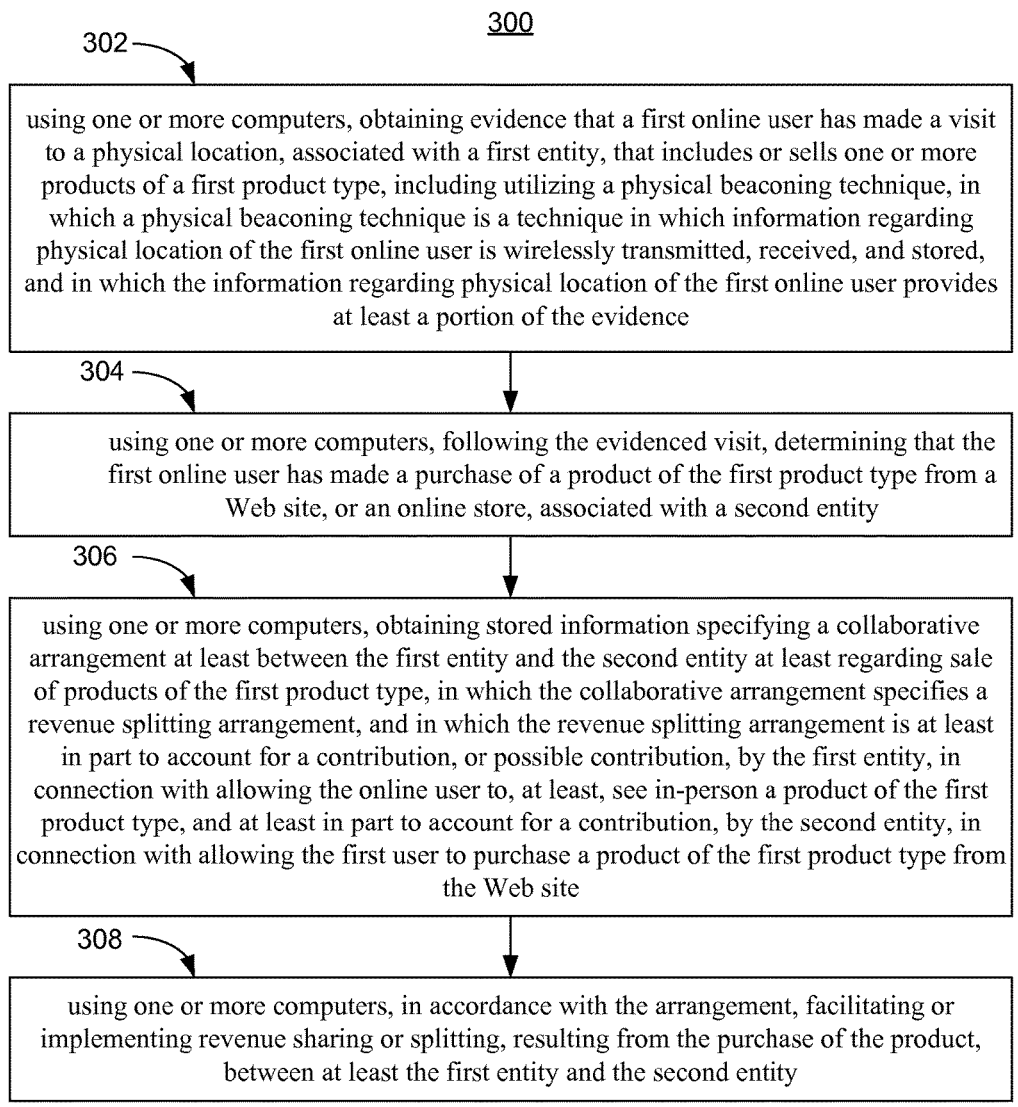
FIG. 3 is a flow diagram illustrating a method according to one embodiment of the invention.

FIG. 3 is a flow diagram illustrating a method 300 according to one embodiment of the invention. Step 302 includes, using one or more computers, obtaining evidence that a first online user has made a visit to a physical location, associated with a first entity, that includes or sells one or more products of a first product type. This can include utilizing a physical beaconing technique, in which a physical beaconing technique is a technique in which information regarding physical location of the first online user is wirelessly transmitted, received, and stored, and in which the information regarding physical location of the first online user provides at least a portion of the evidence.

Step 304 includes, using one or more computers, following the evidenced visit, determining that the first online user has made a purchase of a product of the first product type from a Web site associated with a second entity.

Step 306 includes, using one or more computers, obtaining stored information specifying a collaborative arrangement at least between the first entity and the second entity at least regarding sale of products of the first product type. The collaborative arrangement specifies a revenue splitting arrangement, which is at least in part to account for a contribution, or possible contribution, by the first entity, in connection with allowing the online user to, at least, see in-person a product of the first product type, and at least in part to account for a contribution, by the second entity, in connection with allowing the first user to purchase a product of the first product type from the Web site.

Step 308 includes, using one or more computers, in accordance with the arrangement, facilitating or implementing revenue sharing or splitting, resulting from the purchase of the product, between at least the first entity and the second entity.

Figure 4:
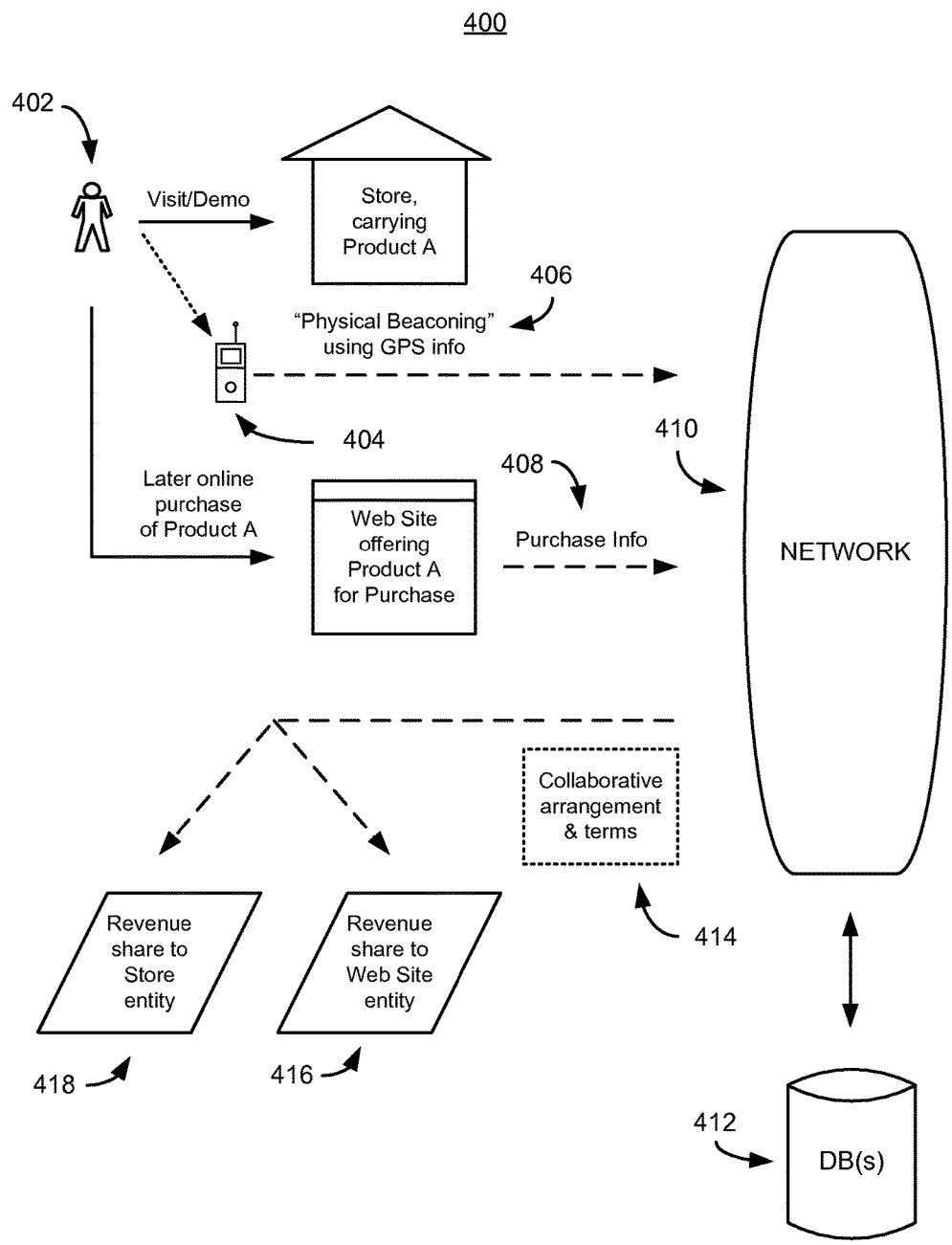
FIG. 4 is a block diagram illustrating one embodiment of the invention.

FIG. 4 is a block diagram 400 illustrating one embodiment of the invention. As depicted, a user 402 makes a visit of a physical store carrying product A. A "physical beaconing" technique 406 is utilized, which includes GPS information transmitted from the user's cell phone 404 to a network 410, where it is stored in one or more databases 412 that may or may not be part of the network 410. This information could be used to indicate or provide evidence of the user's visit, for example.

Later, the user 402 makes on online purchase from a Web site (which can include any Web-based purchase or a purchase from an online store or other online presence that provides a purchase capability to users) of the product, and associated information 408 is communicated, or beaconed, to the network 410 and stored in one or more databases 412.

Following this, according to information regarding a collaborative arrangement, which may be transmitted to the network 410 and stored in the one or more databases 412, the network 410 is used to, or in, facilitating or implementing revenue or other value sharing, splitting, allocation, and/or distribution in accordance with the arrangement or terms thereof. This can be between entities including the physical store 418 or an entity or entities associated with it and the Web site 416 or an entity or entities associated with it. While not depicted, it can also include entities such as the network 410 itself or an entity or entities associated with the network 410, which may, for example, be included in the arrangement and may obtain a share of revenue or value for facilitating or implementing aspects of or relating to the arrangement.

Figure 5:
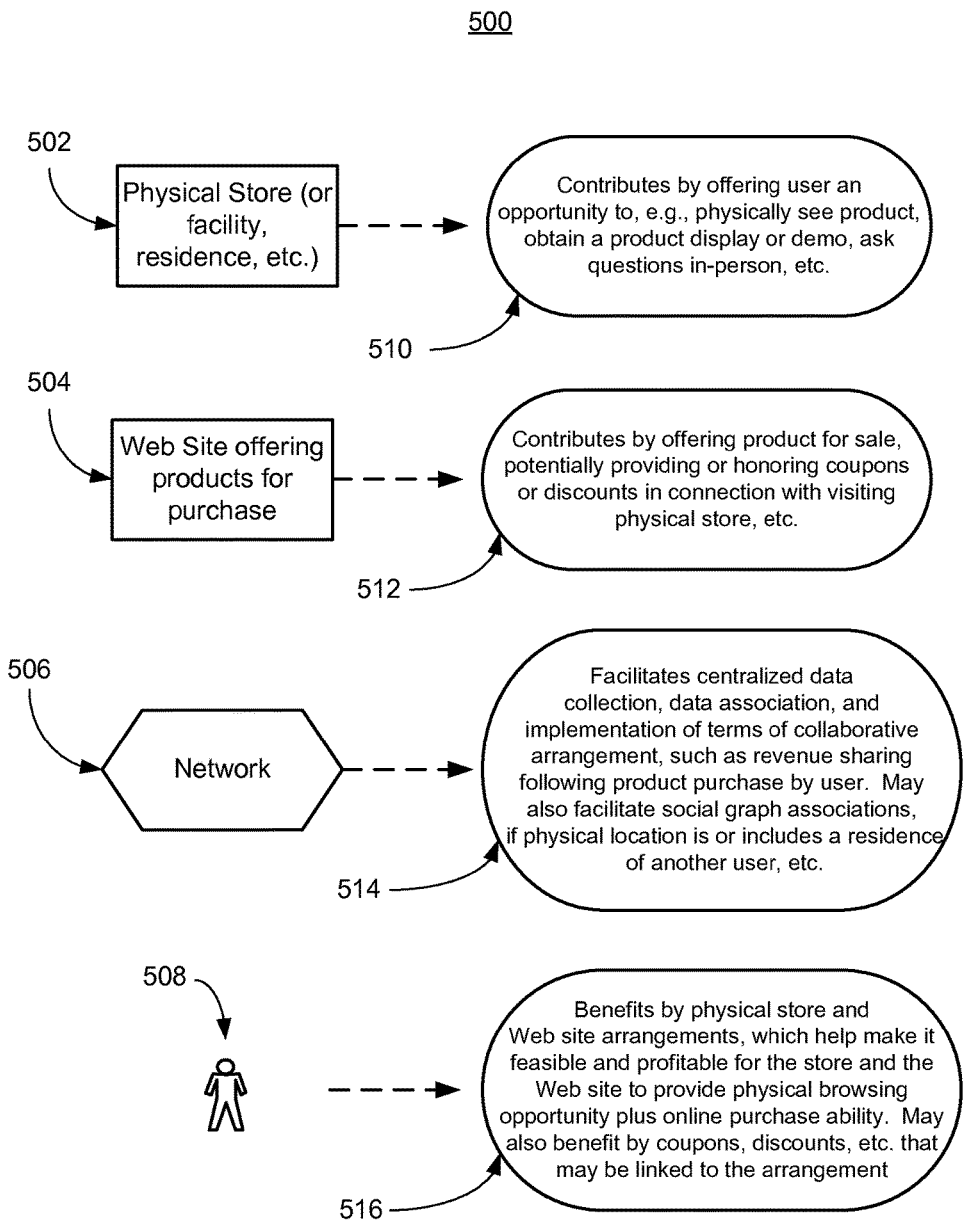
FIG. 5 is a block diagram illustrating one embodiment of the invention.

FIG. 5 is a block diagram 500 illustrating one embodiment of the invention. Various entities are conceptually depicted, which may be included in methods according to some embodiments of the invention. Also depicted are potential role aspects or contributions of such entities, according to some embodiments of the invention, or arrangements relating thereto. Specifically, block 502 represents a physical store (or facility, residence, etc.). As depicted by block 510, the store, etc., may contribute, for example, by offering a user or shopper an opportunity to, for example, physically see a product (such as of a particular type), obtain a product display or demo, ask questions in-person, etc.

Block 504 represents a Web site (which can include a portion thereof) offering products for purchase (such as of the particular type). As depicted by block 512, the Web site may contribute, for example, by offering the products for sale, potentially providing or honoring coupons or discounts in connection with visiting a physical store carrying a product, etc.

Block 506 represents a network (which can, for example, be or include a Web portal, among other things). As depicted by block 514, the network may contribute, for example, by facilitating centralized data collection, data association, and implementation of terms of a collaborative arrangement, such as may include revenue sharing following product purchase by a user. The network may also facilitate storing social network or social graph information, and making associations, such as if the physical location is or includes a residence of another user, who may be socially connected to the purchasing user, for instance.

Block 508 represents a user. As depicted by block 516, the user may benefit by physical store (or residence) and Web site arrangements, which may help make it feasible and profitable for the store and the Web site to operate, or operate optimally or in an integrated fashion, to provide, for example, physical browsing opportunity plus online purchase ability to the user. The user may also benefit by coupons, discounts, etc. that may be linked to the arrangement.

Figure 6:
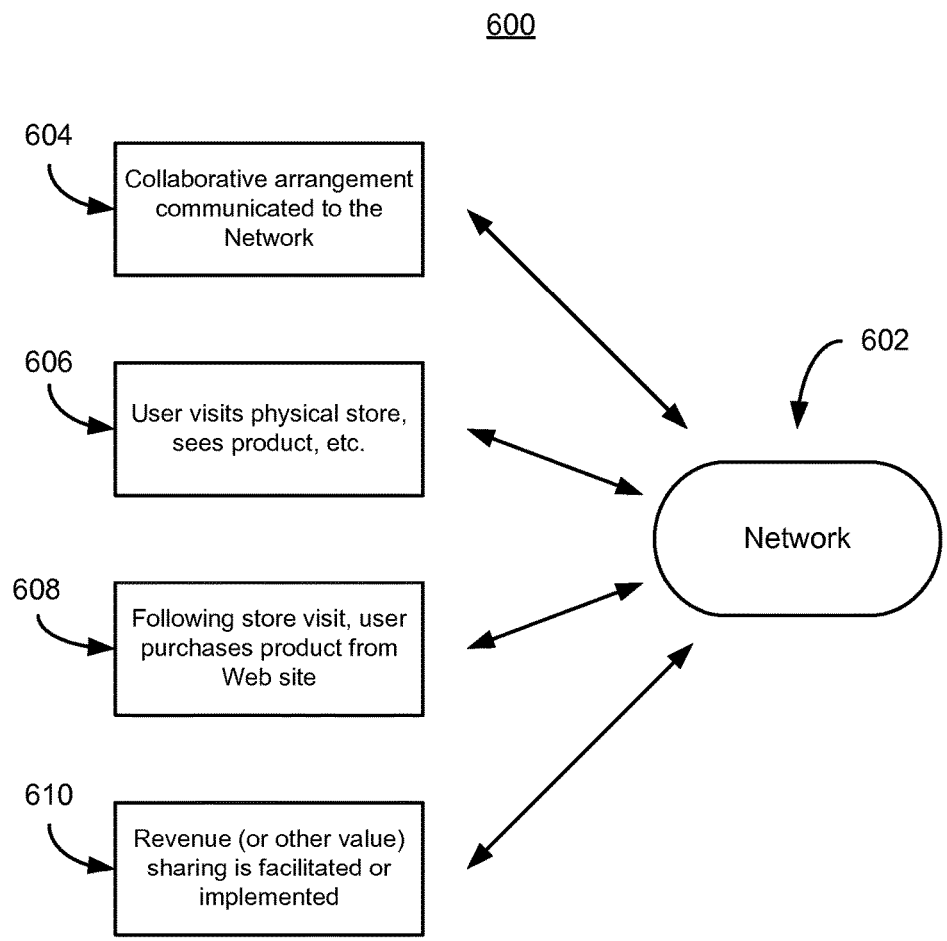
FIG. 6 is a block diagram illustrating one embodiment of the invention.

FIG. 6 is a block diagram 600 illustrating one embodiment of the invention. Block 604 represents a collaborative arrangement, or terms thereof, that is communicated to a network 602.

Block 606 represents a user who visits a physical store, for example, to see a product of a certain type, such as a brand, model, etc. Information relating to the visit, or product demonstrations, etc., is communicated to the network 602. This can include physical beaconing, such as GPS information from the user's smart phone, car GPS, or other device, being sent to the network 602 and evidencing the user's visit, etc.

Block 608 represents the user, following the store visit, making a purchase of a product of the type from a Web site.

Information associated with the purchase is communicated to the network 602, and associated with other information, such as visit information, collaborative arrangement information, and potentially other information such as social graph information, etc.

Block 610 represents facilitation or implementation of revenue sharing or allocation, such as by, using or within the network 602.

Some embodiments of the invention recognize that retail can be a difficult business to be in, especially with the increasing role of online shopping. Yet retail stores provide important value to shoppers. As such, for example, some embodiments of the invention include techniques that can incentivize retailers for the value they provide, which can result in a more optimal ecosystem and ultimately benefit all parties.

Increasingly, people often buy online for various reasons, such as, for example, reasons relating to convenience, research, comparison, price, or tax. Frequently, however, shoppers also tend to physically go and see the product in local stores, for reasons such as style or fit, "look and feel", display, demonstration, trying or use, asking questions in-person in conjunction with physically seeing the product, etc. This may be important with, among other things, certain expensive items such as television sets, stereos, etc. As such, the local stores may act as an agent for displaying, modeling or demonstrating a product. However, if the shopper then leaves and buys the product online, the local store essentially loses, being none the less responsible for paying its rent, inventory fees, store associate salaries, etc., and could eventually even fail. If such inequity results in loss of physical stores or the ability of shoppers to enjoy the benefits and services they provide, the shopper may have no way or have difficulty in seeing products in person, checking "look and feel", etc. This could result in shopper uncertainty and loss of sales, even for online venues.

According to some embodiments, physical and online stores or entities, with collaborative arrangements in place with each other, may proactively suggest to or incentivize users to use the physical store to see the product before purchasing from the online store. This may make sense because both the physical store and the online store benefit by this, and the user may be more likely to make a purchase online after the user sees the product physically, and, moreover, in some embodiments, the user may be further incentivized, such as by a coupon or discount, for example. For instance, a user may begin browsing online for a product, such as at an online store. In some embodiments, the online store may proactively incentivize the user to visit a physical store (with which the online store has a collaborative arrangement in place) to see the product. For example, the online store may provide the user with a coupon or discount if the user visits the physical store (and registers proactively or is passively detected by GPS information, etc.) and then purchases the product from the online store. Similarly, physical stores may provide discounts, coupons or other incentives for users to purchase from an online retailer with which the physical store has a collaborative arrangement, for example. Furthermore, analogous incentive techniques can be used in the context of friend, rather than physical store, displays or product demos, for example.

Some embodiments of the invention provide a system that allows owners or keepers of various products (which can include "brick and mortar" retailers, friends, family) to be incentivized by benefit provided after a purchase has been made, such as for displaying or demonstrating a product. Some embodiments, for example, include arrangements that allow a local vendor to get a reasonable share of revenue from the sale. In various embodiments, this can be done with different individual triggers, or by combining various triggers. Additionally, in some embodiments, since users have physically seen products before online purchase, the users may be less likely to return the products they buy online.

In some embodiments, for example, if a user is interested in product X and the system detects, or detects evidence, that the user has visited a local store to see (at least) the product, then the system may match the known user interest with the visit and perhaps other information, and process or facilitate agreed upon collaborative arrangements, incentives, sharing, etc. Aspects of this can be thought of as physical beaconing, or location-based beaconing, which has an analogy with online beacons as are in current use. For example, online beaconing may be used in a situation where a Web site, Web site A, directs users to another Web site, Web site B, where the user makes a purchase. Beaconing may be used to trigger and send information showing the user's visit to Web site A and other aspects thereof. Using this information, Web Site A may, for example, receive a cut or portion of the purchase revenue for its role in bringing the customer to Web site B.

In some ways, according to some embodiments of the invention, physical beaconing can be thought of as applying an idea that is analogous to online beaconing, but in a new way and context. For example, physical beaconing, such as using geographic location information, may be used in attributing credit to a physical store in facilitating and sending leads to a Web site for an online purchase.

Some embodiments of the invention can thus be thought of as linking an online or virtual entity (the Web site or an associated entity) with a physical entity (the physical store or an associated entity, or even a friend who owns the product and whose residence is visited), such as in connection with a product purchase. Information about this link, and associated arrangements and specifics, may be stored, and then, upon one or more triggering events, the link may be acted upon. For example, detection of an applicable store visit (and perhaps other information) and an applicable online purchase may trigger revenue sharing from the transaction.

The following scenario can be used to illustrate use of some embodiments of the invention. Suppose that a shopper, Dan, visits a physical retail store, Electronics Store, to see the new 80 inch Brand Z 3D high definition television set. After seeing it, and watching and hearing it, he decides it may be worth the roughly $5,000.00 to get it. However, Dan suspects that he can find a better deal on the Internet. In the store, Dan uses a Network (such as a Web portal) App on his smart phone to quickly check to see if there is a better price available online. It turns out that Online Retailer A is offering the same TV for $200 less. So, he buys the TV from Online Retailer A.

In the foregoing scenario, Dan used Electronics Store to see, watch and listen to the TV. He also might have asked questions to store associates, etc. Scenarios like this occur frequently, yet stores like Electronics Store may not benefit at all for providing the value that they provide.

According to some embodiments of the invention, however, stores like Electronics Store in the above scenario can be included in the benefit. A collaborative arrangement between Online Retailer A and Electronics Store, and including products such as the TV, may be stored on, or accessible to, the network. Dan's visit to Electronics Store (which, network information may confirm, carries the TV) may be evidenced by GPS information from his smart phone or car GPS system (a potential example of physical beaconing), for example, may provide a trigger for later association. Additionally, or alternatively, another trigger can be provided utilizing detection and storage by the network of information indicating that Dan used his network App to look up the prices offered on the TV. In some embodiments, Dan's purchase from Online Retailer A would trigger association with the physical beaconing from Electronics Store, and, in accordance with the collaborative arrangement, the network would facilitate Electronics Store receiving an incentive for, at least potentially, showing the TV, etc. Furthermore, in some embodiments, arrangements or the collaborative arrangement can include the network or an associated entity or entities obtaining a share of revenue from the purchase, or other incentive or value, for its role in, for example, data association, communication, facilitating the arrangement, etc.

Another scenario could include the following. A shopper, Joe, needs a new stereo system and found a really good deal on Online Store, which is an online store that is part of the network. It is quite a bit of money, so Joe does not want to purchase it without listening to it first. Luckily, Joe has a friend, Dan, who has that stereo system. Joe visits Dan's house to listen to it, likes it, and then buys it at Online Store via his network App. In some embodiments of the invention, Dan may have previously registered his stereo with the network. Supposing that Dan has further registered on the network as participating in a collaborative arrangement. In some embodiments, since the network has access to social graph information indicating that Joe and Dan are friends, or are otherwise socially connected, and since Dan registered his stereo ownership on the network, and since Joe purchased his stereo via a network-operated online store, it is possible that this all data can be linked and, according to terms of the arrangement, Dan could get a share of revenue from the purchase by Joe.

Networks, such as may include Web portals, for instance, may have a wealth of information that can be used in various implementations of techniques according to embodiments of the invention. For example, the network may have, or have access to, one or more databases with information on physical and online retailers and products they carry or have in stock, various products and types of products (such as brands, models, groups of brands or models, other specific products, or categories or groups of products, etc.). Other network-accessible information may include network users, user social groups and social graph information. Furthermore, network users may use applications, or apps, of or associated with the network, allowing network access to application usage information relating to users. The network may also have a sophisticated data association and processing system, allowing associations between data, events, etc, as well as facilitation, allocation or implementation of collaborative arrangements that may include revenue sharing from product purchases, for example. All of this information and these capabilities can allow certain networks to effectively or optimally implement techniques according to various embodiments of the invention.

The following outlines a use case scenario that may occur according to an embodiment of the invention. First, a user may look up a TV on a network app. The user's location may be sent to the network, from which it may be determined that the user is visiting a particular physical store. The network may then determine that the store sells the TV that the user looked up on the network app. Using a network app, the user then purchases the TV from an online store associated with the network. The network then associates this various information, as well as a stored collaborative arrangement, leading to facilitation of revenue sharing with the physical store, and possibly including a share to the network as well.

The following is another possible use case scenario that may occur according to an embodiment of the invention. The network may detect online searching and browsing by a user that triggers a determination that the user is interested in Product X. The user then visits Physical Store A, which carries product X. Physical beaconing utilizing geolocation is used in detecting that the user has visited Physical Store A, and the user's interest in Product X is linked to the visit of Physical Store A, which carries Product X. The user then purchases Product X from an Online Store S. The network links this purchase as well, and, in accordance with a stored collaborative arrangement or agreement, facilitates revenue distribution accordingly, which can include a share to Physical Store A.

Some embodiments of the invention provide models or business models. In some embodiments, online retailers may agree to fund or partially fund the incentives or shares of revenue to be provided to entities that physically show or demo products. According to some arrangements, the network may be entitled to and take a share of revenue, or other payment, for its contributions, and may, also in accordance with some arrangements, allocate or provide the shares to entities that physically show or demo products. The online retailer (or retailers, in a multi-party arrangement) may be willing to fund or partially fund such incentives or shares to the entities that physically show or demo products, since, particularly for expensive items, users may not be willing to purchase without first physically seeing or demoing the product. As such, it may benefit the online retailer or retailers to incentivize the entities that show or demo products, to ensure that such entities will remain in operation, and perhaps may provide more, or more optimal, or more convenient services to shoppers, in light or their incentivization.

While the invention is described with reference to the above drawings, the drawings are intended to be illustrative, and the invention contemplates other embodiments within the spirit of the invention.

The invention claimed is:

1. A method of distributing revenue over a network to physical and online entities, the method comprising:
   utilizing a physical beaconing technique wherein information regarding the physical location of the first online user is wirelessly transmitted, received, and stored, and wherein the information regarding the physical location provides at least a portion of the evidence, including receiving GPS information indicating a physical location from an electronic user device of a first online user;
   making associations between the received GPS information and information from one or more databases related to physical and online location of products and based on the associations and a known user interest, determining that the first online user has made a visit to a physical location associated with a first entity, wherein the first entity sells one or more products of a first product type related to the known user interest;
   following the determination of the visit, receiving a trigger that the first online user has made a purchase of a product of the first product type from an online store associated with a second entity, wherein the trigger is based on association between information related to the visit and information related to the purchase received from a purchasing server stored on one or more databases related to purchasing, and wherein the purchasing server comprises a processor and accesses the one or more databases related to purchasing modified with the purchasing information associated with the purchase of the product of the first product type upon the purchase by the first online user;

based on the received trigger, querying stored arrangement information for a link between the first entity and the second entity from one or more databases related to collaborative arrangements specifying a collaborative arrangement at least between the first entity and the second entity at least regarding sale of products of the first product type;

in accordance with the collaborative arrangement, allocating a portion of revenue resulting from the purchase of the product of the first product type, between at least the first entity and the second entity; and providing payment to the first entity based on the allocated portion of revenue.

2. The method of claim 1, comprising obtaining the stored information, wherein the collaborative arrangement specifies a revenue splitting arrangement, and wherein the revenue splitting arrangement is at least in part to account for a contribution, by the first entity, in connection with the first online user, at least, seeing in-person the product of the first product type, and at least in part to account for a contribution, by the second entity in connection with the first online user purchasing the product of the first product type from the online store.

3. The method of claim 1, further comprising utilizing a physical beaconing technique, wherein the physical beaconing technique includes a technique in which GPS coordinates regarding the physical location of the first online user are wirelessly transmitted, received, and stored, and wherein the GPS coordinates provide at least a portion of the evidence.

4. The method of claim 1, further comprising utilizing a physical beaconing technique, wherein the physical beaconing technique includes a technique in which GPS coordinates regarding the physical location of the first online user are wirelessly transmitted, from the user device of a first online user including a smart phone, GPS system or other portable electronic device situated on the first online user, or situated on or in a vehicle used by the first user, and wherein the physical beaconing technique is a technique in which the GPS coordinates are received and stored, and wherein the GPS coordinates provide at least a portion of the evidence.

5. The method of claim 1, comprising obtaining evidence that the first online user has made a visit to the physical location, associated with a first physical store that sells one or more products of the first product type.

6. The method of claim 1, comprising obtaining evidence that the first online user has made a visit to the physical location, associated with a first physical commercial facility that, at least, offers or provide display or demonstration of one or more products of the first product type.

7. The method of claim 1, wherein the first entity is an owner, manager or operator of the physical location or of a home, store or other commercial facility at the physical location.

8. The method of claim 1, wherein the physical location is a region, an area, an approximate region, or an approximate area.

9. The method of claim 1, wherein the first entity is a second online user, and wherein the physical location is a residence of the second online user, and wherein stored information indicates that the product of the first product type is at the residence, or is owned by the second online user.

10. The method of claim 1, wherein the first entity is a second online user, and wherein the physical location is a residence of the second online user, and wherein stored information indicates that the product of the first product type is at the residence or owned by the second online user, and wherein the second online user is determined by stored social graph information to be socially connected to the first online user.

11. The method of claim 1, comprising receiving evidence that the first online user has obtained a physical demonstration of the product of the first product type during the visit.

12. The method of claim 1, comprising the first online user utilizing a coupon or other discount provided to the first online user at the Web site or the online store and relating at least in part to the visit to the physical location.

13. The method of claim 1, wherein the first online user proactively communicates information regarding the visit, and wherein, at least in part as a result, a coupon, discount or other incentive is provided to the first online user by the Web site or the online store for use for an online purchase of the product of the first product type.

14. The method of claim 1, wherein the first product type is a brand, model, model type, or among a specified group of brands, models, or model types.

15. A system comprising:
one or more server computers coupled to a network; and
one or more databases coupled to the one or more server computers;
wherein the one or more server computers are configured for:
utilizing a physical beaconing technique wherein information regarding the physical location of the first online user is wirelessly transmitted, received, and stored, and wherein the information regarding the physical location provides at least a portion of the evidence, including receiving GPS information indicating a physical location from an electronic user device of a first online user;
making associations between the received GPS information and information from one or more databases related to physical and online location of products and based on the associations and a known user interest, determining that the first online user has made a visit to a physical location associated with a first entity, wherein the first entity sells one or more products of a first product type related to the known user interest;
following the determination of the visit, receiving a trigger that the first online user has made a purchase of a product of the first product type from an online store associated with a second entity, wherein the trigger is based on association between information related to the visit and information related to the purchase received from a purchasing server stored on one or more databases related to purchasing, and wherein the purchasing server comprises a processor and accesses the one or more databases related to purchasing modified with the purchasing information associated with the purchase of the product of the first product type upon the purchase by the first online user;
based on the received trigger, querying stored arrangement information for a link between the first entity and the second entity from one or more databases related to collaborative arrangements specifying a collaborative arrangement at least between the first entity and the second entity at least regarding sale of products of the first product type;

in accordance with the collaborative arrangement, allocating a portion of revenue resulting from the purchase of the product of the first product type, between at least the first entity and the second entity; and providing payment to the first entity based on the allocated portion of revenue.

16. The system of claim 15, wherein at least one of the one or more server computers are coupled to the Internet.

17. The system of claim 15, wherein the collaborative arrangement specifies a revenue splitting arrangement, and wherein the revenue splitting arrangement is at least in part to account for a contribution, by the first entity, in connection with an online user, at least, seeing in-person the product of the first product type, and at least in part to account for a contribution, by the second entity in connection with a first user purchasing the product of the first product type from the Web site or the online store.

18. A non-transitory computer readable medium or media containing instructions for executing a method comprising:

utilizing a physical beaconing technique wherein information regarding the physical location of the first online user is wirelessly transmitted, received, and stored, and wherein the information regarding the physical location provides at least a portion of the evidence, including receiving GPS information indicating a physical location from an electronic user device of a first online user;

making associations between the received GPS information and information from one or more databases related to physical and online location of products and based on the associations and a known user interest, determining that the first online user has made a visit to a physical location associated with a first entity, wherein the first entity sells one or more products of a first product type related to the known user interest;

following the determination of the visit, receiving a trigger that the first online user has made a purchase of a product of the first product type from an online store associated with a second entity, wherein the trigger is based on association between information related to the visit and information related to the purchase received from a purchasing server stored on one or more databases related to purchasing, and wherein the purchasing server comprises a processor and accesses the one or more databases related to purchasing modified with the purchasing information associated with the purchase of the product of the first product type upon the purchase by the first online user;

based on the received trigger, querying stored arrangement information for a link between the first entity and the second entity from one or more databases related to collaborative arrangements specifying a collaborative arrangement at least between the first entity and the second entity at least regarding sale of products of the first product type;

in accordance with the collaborative arrangement, allocating a portion of revenue resulting from the purchase of the product of the first product type, between at least the first entity and the second entity; and providing payment to the first entity based on the allocated portion of revenue.

* * * * *